US010948639B2

(12) United States Patent
Panzlaff et al.

(10) Patent No.: US 10,948,639 B2
(45) Date of Patent: Mar. 16, 2021

(54) SUN FILTER FOR SPACECRAFT

(71) Applicant: TESAT-SPACECOM GMBH & CO. KG, Backnang (DE)

(72) Inventors: Konrad Panzlaff, Backnang (DE); Andrej Brzoska, Beilstein (DE); Wolfgang Holota, Neuhaus/Schliersee (DE); Martin Schwab, Obererlbach (DE); Gerd Mühlnikel, Backnang (DE); Carsten Fechtmann, Backnang (DE)

(73) Assignee: TESAT-SPACECOM GMBH & CO. KG, Backnang (DE)

( * ) Notice: Subject to any disclaimer, the term of this patent is extended or adjusted under 35 U.S.C. 154(b) by 532 days.

(21) Appl. No.: 15/804,541

(22) Filed: Nov. 6, 2017

(65) Prior Publication Data

US 2018/0128951 A1 May 10, 2018

(30) Foreign Application Priority Data

Nov. 9, 2016 (DE) ...................... 10 2016 121 484.1

(51) Int. Cl.
*G02B 27/14* (2006.01)
*G02B 27/10* (2006.01)
(Continued)

(52) U.S. Cl.
CPC ............. *G02B 5/26* (2013.01); *B64G 1/1007* (2013.01); *B64G 1/50* (2013.01); *B64G 1/58* (2013.01);
(Continued)

(58) Field of Classification Search
CPC .............. G02B 27/145; G02B 27/0172; G02B 27/0149; G02B 27/144; H04B 10/2587
(Continued)

(56) References Cited

U.S. PATENT DOCUMENTS 5,367,399 A * 11/1994 Kramer ................ G02B 26/106
250/236
5,558,934 A * 9/1996 Rowell .................... G01J 3/453
428/333

(Continued)

FOREIGN PATENT DOCUMENTS

EP        1256832 A2     11/2002

*Primary Examiner* — Dawayne Pinkney
(74) *Attorney, Agent, or Firm* — Jenkins, Wilson, Taylor & Hunt, P.A.

(57) ABSTRACT

A device for a sending and receiving unit of a communication arrangement is provided. The device includes: a first passage for electromagnetic waves and a second passage for electromagnetic waves; a partially transparent surface which is transparent for electromagnetic waves of a first wave length range and which is reflective for electromagnetic waves of a second wave length range, wherein the second wave length range differs from the first wave length range; and a first retroreflective surface which is retroreflective for electromagnetic waves of the first wave length range. A direction of reflection of the electromagnetic waves of the first wave length range differs from a direction of reflection of the electromagnetic waves of the second wave length range if the electromagnetic waves of the first wave length range as well as the electromagnetic waves of the second wave length range are incoming through the same passage.

15 Claims, 2 Drawing Sheets

(51) Int. Cl.
- *H04B 10/00* (2013.01)
- *G02B 5/26* (2006.01)
- *B64G 1/50* (2006.01)
- *G02B 5/28* (2006.01)
- *G02B 5/124* (2006.01)
- *G02B 5/22* (2006.01)
- *H04B 10/40* (2013.01)
- *B64G 1/10* (2006.01)
- *B64G 1/58* (2006.01)
- *B64G 1/66* (2006.01)
- *G02B 5/12* (2006.01)
- *G02B 5/20* (2006.01)
- *H04B 10/112* (2013.01)
- *H04B 10/118* (2013.01)

(52) U.S. Cl.
CPC ............... *B64G 1/66* (2013.01); *G02B 5/12* (2013.01); *G02B 5/124* (2013.01); *G02B 5/208* (2013.01); *G02B 5/22* (2013.01); *G02B 5/281* (2013.01); *G02B 27/1006* (2013.01); *H04B 10/1123* (2013.01); *H04B 10/40* (2013.01); *H04B 10/118* (2013.01)

(58) Field of Classification Search
USPC .......... 359/630–634, 618, 629; 398/168–170
See application file for complete search history.

(56) References Cited

U.S. PATENT DOCUMENTS

| | | |
|---|---|---|
| 6,073,888 A | 6/2000 | Gelon et al. |
| 2003/0081293 A1* | 5/2003 | Wood, Jr. ............ H04B 10/1121 398/126 |
| 2005/0128589 A1* | 6/2005 | Lee ........................ G02B 5/122 359/529 |
| 2009/0279181 A1* | 11/2009 | Hsieh .................... H04L 27/223 359/634 |
| 2018/0128951 A1 | 5/2018 | Panzlaff et al. |

\* cited by examiner

SUN FILTER FOR SPACECRAFT

CROSS-REFERENCE TO PRIORITY APPLICATION

This application claims the benefit of, and priority to, German patent application number DE 10 2016 121 484.1, filed on Nov. 9, 2016. The content of the referenced application is incorporated by reference herein.

TECHNICAL FIELD

The present disclosure relates to a device for a sending and receiving unit of a communication arrangement and to a spacecraft with such a device. In particular, the disclosure relates to improving of thermal load of the thermal flow with regard to the components of such a device as well as with regard to a spacecraft with such a device.

BACKGROUND

Dealing with thermal load may be a major challenge, in particular in connection with spacecraft that are used and operated out of the earth's atmosphere. This is because the heat exchange can take place only by heat conduction and thermal radiation due to lack of atmosphere and without convection.

Basically, heat may flow from a place with higher temperature to a place with lower temperature by heat conduction (also: heat diffusion or conduction) or by thermal radiation. Apart from that, heat transport by convection is also possible, wherein for this purpose a macroscopic material stream is necessary. Out of the earth's atmosphere, i.e., in vacuum, heat transport by convection is not possible due to lack of atmosphere. The present or missing or varying irradiation of an object by radiating sources, in particular also by the sun, may result in very high fluctuations in temperature within the object. This establishes a big challenge for man-made spacecraft, in particular as the used components need to be specified for a limited temperature range.

U.S. Pat. No. 6,073,888 describes a satellite that circles the earth and that comprises a temperature radiator. The temperature radiator is configured to discharge heat from a heat source and to radiate it into space. A heat conductor extends between the temperature radiator and the heat source and thermal switches are arranged to connect the heat source with the temperature radiator and to reduce the temperature of the heat source if the temperature exceeds a predetermined threshold value.

BRIEF SUMMARY

There may be a need to reduce a temperature gradient in a communication device, in particular a spatial temperature gradient, i.e., a temperature difference between two points of an object at the same time t, and, in particular, to reduce or to eliminate an unwanted loss or an unwanted induction of thermal radiation at a communication device.

According to a first aspect, a device for a sending and receiving unit of a communication arrangement is provided. This device may be part of the communication device or an upgrade or additional installation that is arranged in a signal transmission path.

According to an embodiment, the device comprises a first passage for electromagnetic waves and a second passage for electromagnetic waves. The first and the second passage may be referred to as signal input or signal output, respectively. For optical signals, these may be recesses or openings that enable passage of the optical signals. The device may be arranged for unidirectional or also for bidirectional signal transmission in a half-duplex or full-duplex mode. Thus, the first as well as the second passage may be considered as signal input or signal output or both.

In this embodiment, the device furthermore comprises a partially transparent surface which is transparent for electromagnetic waves of a first wave length range and which is reflective for electromagnetic waves of a second wave length range, wherein the second wave length range differs from the first wave length range. The partially transparent surface may also be referred to as partially reflective surface.

In the context of this description, the phrase "partially transparent" shall be understood such that the partially transparent surface is transparent for a first wave length range of electromagnetic waves and is substantially non-transparent (impenetrable) for a second wave length range of electromagnetic waves and reflects electromagnetic waves of the second wave length range.

In particular, electromagnetic waves of the second wave length range are reflected by the partially transparent surface such that they are directed or reflected from the first passage to the second passage and/or vice versa, whereas the electromagnetic waves of the first wave length range are not or rather not reflected by the partially transparent surface.

In this embodiment, the device furthermore comprises a first retroreflective surface which is retroreflective for electromagnetic waves of the first wave length range. Here, a direction of reflection of the electromagnetic waves of the first wave length range differs from a direction of reflection of the electromagnetic waves of the second wave length range if the electromagnetic waves of the first wave length range as well as the electromagnetic waves of the second wave length range enter or intrude through the same passage.

In the context of this description, the term "retroreflective" shall be understood such that the retroreflective surface reflects an incoming electromagnetic wave in the same angle as it comes in. In other words, an incoming or incident electromagnetic wave is reflected to its source and apart therefrom, it is not deflected or redirected. For example, the retroreflective surface may be configured such that it has the retroreflective characteristic in a given angular range, wherein this angular range is between 80° and 100°, in particular 85° to 95°, in particular 90° of the incoming electromagnetic wave with respect to the retroreflective surface.

The electromagnetic waves of the second wave length may be a signal carrier of an optical wireless communication path. In particular, this may be laser radiation or a laser beam. The electromagnetic waves of the first wave length may be thermal radiation.

The structure described herein has the advantage that the signal carrier, i.e., the electromagnetic waves of the second wave length range, are directed from one passage to the other passage, whereas the electromagnetic waves of the first wave length range are prevented from taking the same path as they are not reflected by the partially transparent surface. Thus, it may be particularly achieved that the thermal radiation, for example, follows another path than the signal carrier. Hence, the extent of the thermal radiation that leaves the device through the first and second passage and/or that intrudes the device through these passages may be reduced or even eliminated. Thus, it may be achieved that a fluctuation in temperature and a possible bandwidth of temperature (i.e., the difference between maximum temperature of the device at the highest possible energy input from the outside and minimum temperature of the device at the highest possible loss of energy outwardly) in the device is reduced.

If the signal carrier as well as the thermal radiation come in through the first passage, i.e., through the same passage, the signal carrier is reflected towards the second passage and the thermal radiation is reflected back towards the first passage. This means that the direction of reflection of the electromagnetic waves of the first wave length range differs from a direction of reflection of the electromagnetic waves of the second wave length range.

In the context of this description, the partially transparent surface together with the first retroreflective surface and the two passages may be referred to as deflection unit.

The direction of reflection of the electromagnetic waves of the first wave length range differs from the direction of reflection of the electromagnetic waves of the second wave length range. This means, for example, that the electromagnetic waves of the first wave length range (the thermal radiation) is reflected by the retroreflective surface back to its origin or source. If the electromagnetic waves of the first wave length range intrude through the first passage into the deflection unit they are reflected such that they exit the deflection unit through the same passage. The electromagnetic waves of the second wave length range (the signal carrier) intrude into the deflection unit through a passage and are reflected such that they exit the deflection unit through another passage. The signal carrier corresponds to the communication signal and must, of course, leave (exit) the device in a direction towards a remote station, so that a communication connection can be established.

According to an embodiment, the electromagnetic waves of the first wave length range are radiation having a wave length up to 1000 nm (inclusively) and between 1600 nm and 1 mm (each inclusively). The wave length range between 1600 nm and 1 mm may also be referred to as long wave thermal radiation. In other words, the partially transparent surface is configured to let pass radiation in this wave length range, i.e., to be transparent therefor, and the retroreflective surface is configured to reflect electromagnetic radiation in this wave length range.

This enables that radiation, in particular thermal radiation, is reflected by the retroreflective surface to its origin so that it is prevented or at least reduced that said radiation leaves the deflection unit or intrudes into the components being arranged behind the deflection unit.

It is noted that the partially transparent surface may be configured to be transparent for one or multiple predetermined wave length ranges from said range starting at 1600 nm up to 1 mm. Thus, the term "wave length range" as used in the context of this application is not mandatorily be understood as a single continuous (without interruption) number range (however, may be one), but may also comprise a multitude of ranges spaced apart from each other on the scale of the wave lengths. Thus, the partially transparent surface may be transparent for electromagnetic waves having a wave length up to 1000 nm (inclusively) and from 1600 nm (inclusively) up to 1 mm (inclusively), whereas the partially transparent surface may be designed reflective for the excluded range between 1000 nm and 1600 nm (each exclusively). Of course, a segmentation with smaller wave length ranges is also possible. The partially transparent surface may be referred to as band-stop filter that reflects electromagnetic waves in a small wave length range within a larger wave length range and that is transparent for electromagnetic waves in the remaining range of the larger wave length range.

According to a further embodiment, the electromagnetic waves of the second wave length range are laser radiation.

For example, the used laser wave length may be 1064 nm or 1550 nm. The partially transparent surface may be designed reflective for these wave lengths or for a wave length range that includes the indicated wave lengths, i.e., for example between 1060 nm and 1070 nm or between 1545 nm and 1555 nm or even slightly larger ranges.

The laser radiation is used as a signal carrier on an optical wireless data transmission path and is reflected or deflected by the partially transparent surface.

According to a further embodiment, the partially transparent surface is designed as a dichroitic filter.

A dichroitic filter may also be referred to as interference filter and is designed to mirror or to reflect electromagnetic waves independent of their frequency. Generally, an interference filter may be used to split or break up incoming light in frequency ranges.

In the present case, the dichroitic filter is configured to reflect waves of the signal carrier's wave length and to substantially let pass (and to neither absorb nor reflect) electromagnetic waves of differing wave length, in particular thermal radiation, so that the thermal radiation impinges the retroreflective surface.

The partially transparent surface may comprise a dichroitic coating that has or provides the dichroitic characteristic. In particular, the coating may be non-metallic.

The characteristics of the dichroitic coating may be adapted depending on the wave length of the used signal carrier. This may happen, for example, during design or during manufacturing of the device and may be required because the dichroitic coating must be designed different in dependency of the wave length to be reflected. In the analogy to the band-stop filter used above, it is a matter to adapt the wave length range in which the partially transparent surface reflects electromagnetic waves, namely to the wave length of the used signal carrier. This may be one wave length or one wave length range, however, may also be multiple wave lengths or wave length ranges.

According to a further embodiment, the partially transparent surface comprises germanium.

The partially transparent surface may be designed as a germanium reflector. Here, the dichroitic coating may be applied to the germanium. Germanium allows thermal radiation to pass or is transparent therefor.

The partially transparent surface is arranged between the first retroreflective surface and the two passages. Independent of through which one of the passages the electromagnetic waves intrude into the deflection arrangement, these electromagnetic waves first impinge upon the partially transparent surface and afterwards upon the first retroreflective surface, given that they pass the partially transparent surface and that they are not reflected thereby.

According to a further embodiment, the device furthermore comprises a first thermal insulator, wherein the first thermal insulator is arranged behind the first retroreflective surface from the perspective of the first passage.

The first thermal insulator especially enables that thermal energy that is entered by the thermal radiation into the retroreflective surface has a lowest possible thermal influence to the surrounding components of the deflection arrangement, i.e., that little or no thermal energy is dispensed by the deflection arrangement or is received thereby.

The first thermal insulator may be designed as a black body. A black body (also: full radiator, Planckian radiator, thermal radiation source) absorbs impinging electromagnetic radiation of any wave length or within a given wave length range in the ideal case to 100% and emits thermal radiation as electromagnetic radiation that depends only on the temperature of the body and that is independent of the further characteristics and the surface of the body.

According to a further embodiment, the device furthermore comprises a first heating element that is configured to dispense thermal energy and to supply the thermal energy to the first retroreflective surface.

Thereby, the temperature of the first retroreflective surface may be increased in order to compensate losses and scatter of the thermal radiation resulting from the partially transparent surface, so that the extent of the thermal radiation delivered or emitted by the retroreflective surface (this is the sum of the reflected radiation and the supplied/fed thermal energy) corresponds to the thermal radiation initially introduced to the deflection unit.

The first heating element is configured to generate and emit thermal energy. For example, the first heating element is supplied with electrical energy. Also, the heating element may be configured to be thermally coupled with a consumer, in particular an electric consumer, and to receive waste heat from this consumer and to subsequently emit the received waste heat as thermal energy towards the first retroreflective surface.

According to a further embodiment, the first retroreflective surface comprises a metallic coating.

For example, the metallic coating may comprise or may consist of gold, silver, or copper, or a combination thereof. This coating may be applied to a plastic body. Thereby, the thermal radiation is reflected.

According to a further embodiment, the first retroreflective surface comprises at least one triple reflector element that is configured to reflect incoming electromagnetic radiation back to its origin.

A triple reflector element may reflect radiation that comes in within a predetermined angular range so that it is radiated back to its origin.

The retroreflective surface may comprise a multitude of such triple reflector elements, wherein these are arranged in a two-dimensional manner next to each other. Such a structure may be referred to as triple reflector or retroreflector.

According to a further embodiment, the at least one triple reflector element comprises an opening through which an input of additional thermal radiation may take place, which thermal radiation is dispensed in the same direction as the electromagnetic waves of the first wave length range.

In particular, the additional thermal radiation may be provided by the heating element, as already described above.

According to a further embodiment, the device furthermore comprises a second retroreflective surface, wherein the first retroreflective surface is arranged opposite to the first passage, wherein the second retroreflective surface is arranged opposite to the second passage, and wherein the partially transparent surface is arranged between the first passage and the first retroreflective surface and between the second passage and the second retroreflective surface, so that the electromagnetic waves of the second wave length range that impinge upon the partially transparent surface through the first passage are reflected towards the second passage.

The retroreflective surfaces may be provided as an individual structural component together with the partially transparent surface. For example, the retroreflective surface may be attached to a back side of the partially transparent surface, i.e., at that side of the partially transparent surface that is facing away from the passages. Multiple triple reflector elements may be arranged, wherein some of these triple reflector elements are arranged to reflect thermal radiation in a direction towards the first passage and other triple reflector elements are arranged to reflect thermal radiation in a direction towards the second passage.

Alternatively, the retroreflective surface may be arranged structurally separated from the partially transparent surface.

The second retroreflective surface may be constructed similar to the first retroreflective surface, so that reference to the explanations relating to the first retroreflective surface is made here.

However, it is noted that the second retroreflective surface may also be different to the first retroreflective surface. Hence, openings in the second retroreflective surface may be different from openings in the first retroreflective surface in terms of their shape and their size. The structure of the retroreflective surfaces and of the partially transparent surface may be adapted to the wave length of the used signal carrier during development and/or during production.

According to a further embodiment, the first retroreflective surface as well as the second retroreflective surface are designed flat and the first and second retroreflective surface intersect at an angle unequal to 0° and unequal to 180°.

The first retroreflective surface may be arranged at an angle of 90° with respect to the second retroreflective surface. Other angles are possible. Preferably, the first passage extends parallel to the first retroreflective surface (lies opposite of it) and the second passage extends parallel to the second retroreflective surface.

According to a further embodiment, the device furthermore comprises a sending and receiving unit that is configured to emit the electromagnetic waves of the second wave length range in a direction towards the partially transparent surface and/or to receive electromagnetic waves of the second wave length range that are reflected from the partially transparent surface.

In particular, the sending and/or receiving unit is a component for optical data transmission and is adapted, for example, such that it can send and/or receive laser radiation as to transmit or receive data by doing so. For example, the sending and receiving unit may be arranged in a satellite. In order to prevent that, in addition to the laser radiation or laser beam, also thermal energy is emitted by the sending and receiving unit and, thus, output by or from the satellite, the device with partially transparent surface and retroreflective surface described above is provided. The laser beam is deflected and sent out by the partially transparent surface, whereas the thermal radiation passes the partially transparent surface and is reflected back in a direction towards the sending and/or receiving unit by the retroreflective surface. Thus, loss of thermal energy is reduced or even completely prevented.

The sending and/or receiving unit is arranged such that the first passage is located between the sending and/or receiving unit and the partially transparent surface.

According to a further embodiment, the device furthermore comprises a sun filter and a focusing arrangement, wherein the sun filter is arranged between the focusing arrangement and the second passage, wherein the sun filter is configured to filter radiation immerging into the second passage and to be transparent for electromagnetic waves of the second wave length, and wherein the focusing arrangement is configured to focus electromagnetic waves of the second wave length and to direct them to a remote station.

The device may comprise a second thermal insulator and a second heating element that are assigned to the second retroreflective surface in the same manner as described with reference to the first thermal insulator, the first heating element, and the first retroreflective surface. Resulting from incoming sunbeams or other radiation, the sun filter may heat up and may emit thermal radiation in a direction towards the deflection unit. As to prevent heating the device and/or the deflection unit by this thermal radiation, the second retroreflective surface is provided which reflects this radiation in a direction (back) towards the second passage and the sun filter, wherein, however, received laser signals, i.e., the signals or the signal carrier, are reflected in a direction towards the sending and/or receiving unit by the partially transparent surface.

In particular if the sun filter is not irradiated by the sun, an intense cooling may happen when using in outer space out of the earth's atmosphere and the temperature range within which the sun filter must work may, hence, be very large. In order to reduce fluctuations in temperature at the sun filter, the second heating element may dispense thermal radiation which is delivered via the second retroreflective surface in direction towards the sun filter.

According to another aspect, a spacecraft is provided which comprises a device as described herein, wherein the device is provided for establishing a communication link.

A spacecraft may be a satellite which is provided for being used out of the earth's atmosphere. Such a spacecraft may establish a communication link, in particular an optical wireless communication link, to another air or spacecraft or to a remote station on earth.

The communication device requires mandatorily that signals are emitted and/or received. By the corresponding apertures, a (substantially unwanted) exchange of thermal radiation may happen in both directions. In other words, the spacecraft and/or the components of the communication device may thus cool down if the apertures face towards outer space, i.e., away from a direct irradiation by a radiating source as, for example, the sun. To the contrary, if the apertures face in a direction towards a radiating source as, for example, the sun, this may result in an intense heating of the spacecraft and/or of the components of the communication device. As a result of the structure of the device described herein, it is enabled that as less as possible thermal radiation leaves the spacecraft via the device or enters into the spacecraft. Likewise, the maximum fluctuation in temperature of the sun filter may be reduced.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

In the following, exemplary embodiments are described in more detail with reference to the attached drawings. The drawings are schematic and not to scale. Same reference signs refer to same or similar elements. It is shown in.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
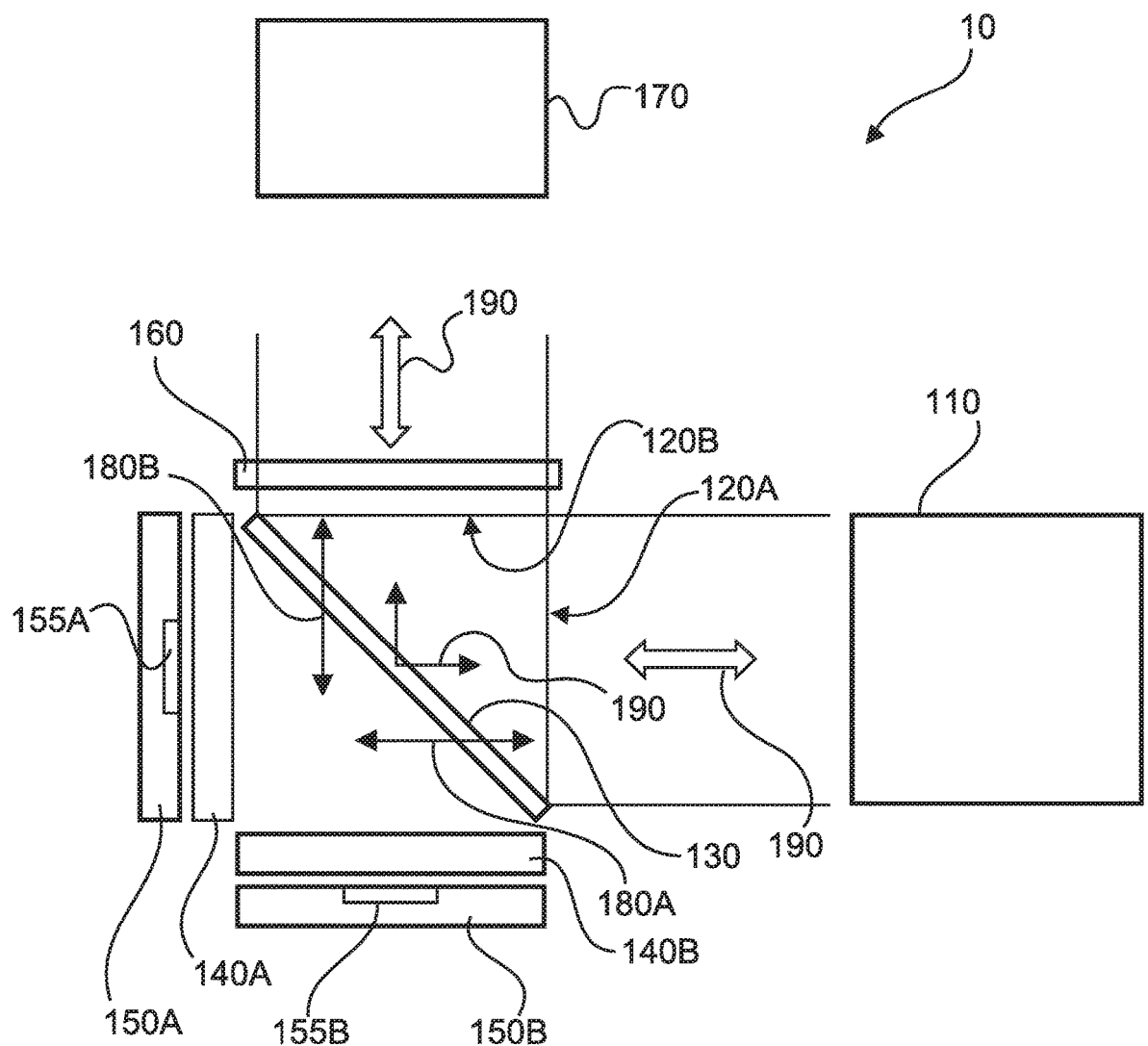
FIG. 1 a schematic representation of a device for a sending and receiving unit of a communication arrangement.

FIG. 1 shows a device 10 for a sending and receiving unit of a communication arrangement. The device comprises: a first passage 120A for electromagnetic waves and a second passage 120B for electromagnetic waves, a partially transparent surface 130 which is designed transparent for electromagnetic waves of a first wave length range 180A, 180B and which is designed reflective for electromagnetic waves of a second wave length range 190 that differs from the first wave length range, and a first retroreflective surface 140A which is designed reflective for electromagnetic waves of the first wave length range 180A, 180B, wherein a direction of reflection of the electromagnetic waves of the first wave length range 180A, 180B differs from a direction of reflection of electromagnetic waves of the second wave length range 190.

The device 10 furthermore comprises: a first thermal insulator 150A which is arranged behind the first retroreflective surface 140A from a perspective of the first passage 120A, and a first heating element 155A which is designed to dispense thermal energy and to supply it to the first retroreflective surface 140A.

The device 10 furthermore comprises: a second retroreflective surface 140B, wherein the first retroreflective surface 140A is arranged opposite to the first passage 120A, wherein the second retroreflective surface 140B is arranged opposite to the second passage 120B, and wherein the partially transparent surface 130 is arranged between the first passage 120A and the first retroreflective surface 140A and between the second passage 120B and the second retroreflective surface 140B, so that the electromagnetic waves of the second wave length range that impinge onto the partially transparent surface 130 through the first passage 120A are reflected in a direction of the second passage 120B.

From a perspective of the second passage 120B, a second thermal insulator 150B and a second heating element 155B are arranged behind the second retroreflective surface 140B.

The device 10 furthermore comprises: a sending and/or receiving unit 110 that is configured to emit the electromagnetic waves of the second wave length range 190 in a direction towards the partially transparent surface 130 and/or to receive electromagnetic waves of the second wave length range 190 that are reflected by the partially transparent surface 130. The device 10 furthermore comprises a sun filter and a focusing arrangement that are arranged in front of the second passage 120B.

In other words, the device 10 is designed such that it is comprised of two partially similar functional branches. A first functional branch includes the sending and/or receiving unit 110, the first passage 120A, the partially transparent surface 130, the first retroreflective surface 140A, the first thermal insulator 150A, and the first heating element 155A. This first functional branch is shown horizontally in FIG. 1.

The second functional branch is designed similar to the first functional branch and is shown vertically in FIG. 1. In addition to the first functional branch, the second functional branch comprises a sun filter 160 and a focusing arrangement 170, wherein in the second functional branch no sending and/or receiving unit 110 is provided. The device 10 is installed in a satellite such that the first functional branch faces towards the inner of the satellite and the second functional branch faces towards the outer of the satellite in a direction towards a remote communication station.

The first functional branch serves the purpose of not letting escape thermal radiation from the communication arrangement or from a satellite, or to reduce the extent of the escaping thermal radiation. As can be recognized in FIG. 1, the sending and/or receiving unit 110 transmits an electromagnetic wave 190, e.g., a laser beam. This laser beam is reflected by the partially transparent surface 130 in a direction towards the second passage 120B and the focusing arrangement. At the same time, thermal radiation 180A that irradiates from the interior space of a satellite is directed through the surface 130 that is transparent for this radiation 180A onto the retroreflective surface 140A and is thereby reflected back in a direction towards the sending and/or receiving unit or towards the interior space of the satellite, so that, as a result, none or almost none thermal radiation escapes the satellite. In order to compensate scatter losses, the extent of the thermal radiation reflected by the retroreflective surface 140A may be increased by adding thermal energy by the heating element 155A.

Basically, the second (vertical) functional branch is designed similar to the first (horizontal) functional branch. Substantially, the second functional branch is designed to prevent intrusion of thermal radiation into the satellite or into the communication arrangement. The sun filter is transparent for the signal carrier 190. However, the sun filter 160 may be heated by solar radiation or sunlight and may deliver thermal radiation 180B into the interior of the deflection arrangement. The second retroreflective surface 140B is arranged to reflect the thermal radiation 180B in a direction of the sun filter so that this thermal radiation 180B does not contribute to heating of the communication arrangement or reduces the extent thereof. The second heating element 155B may contribute to emit thermal radiation in direction of the sun filter 160, so that the sun filter can be heated if it is located on a side of the satellite that faces away from the sun and to, hence, prevent intense cooling of the sun filter.

In the exemplary embodiment of FIG. 1, the first retroreflective surface 140A as well as the second retroreflective surface 140B are designed flat. Both surfaces 140A, 140B are provided as separate structural components separate from the partially transparent surface 130. The surfaces 140A, 140B may be comprised of a plastic body which is coated with a metal. In this exemplary embodiment, the surfaces 140A, 140B are arranged at an angle of 90° with respect to each other.

The sending and/or receiving unit 110 may be, for example, a sending/receiving unit of a laser communication device. On the one hand, the arrangement according to the device 10 as shown is suitable to store the thermal radiation within the unit 110 or to not let it escape, and to heat the sun filter 160 in case the focusing arrangement 170 faces away from the sun or another radiating source. On the other hand, heating of the sending/receiving unit 110 is minimized in case of direct irradiation of the focusing arrangement 170 and the sun filter 160 by the sun. Furthermore, this arrangement is suitable to minimize the thermal gradients in the sending/receiving unit as the partially transparent surface 130 lets the thermal radiation pass and reflects the used laser wave length 190 by a special coating (also: reflection coating, dichroitic, non-metallic). The partially transparent surface 130 may also be designed as a germanium reflector.

The wave length of the laser radiation 190 may be changed and, hence, it may also be required to adapt the reflection coating. However, the operating principle is maintained.

The sun filter 160 is configured to reflect or to absorb as much as possible of the sunbeams (of ultraviolet up to about 1800 nm). The germanium reflector is transparent at longer wave lengths. The sun filter must be transparent or almost transparent for the used laser wave length, e.g., 1064 nm or 1550 nm.

In case of direct sunlight (if the sun is within the field of view of the instrument), a major part (more than 50%) of the wave length range longer than about 400 nm is reflected by the sun filter.

A major part of the wave lengths that is shorter than 400 nm is absorbed. This absorption results in an increase of temperature of the sun filter and, hence, in a change of the emittance in particular in the wave length range from 7 μm up to 12 μm. In order for this change to have a smallest possible impact on the instrument (device 10), this thermal radiation is let pass through the germanium reflector and is absorbed by the second insulator 150B.

In case the sun filter 160 and the focusing arrangement 170 are facing away from the sun, i.e., face towards outer space, it must be prevented that the inner temperature of the device 10 strongly drops due to thermal irradiation. Now, thermal radiation 180A of the device 10 is let pass through the germanium reflector, impinges onto the retroreflective surface 140A, and is reflected in the same direction as the incoming direction. Thus, the thermal radiation comes back into the instrument or into the satellite (possibly with low losses). These losses may and potentially must be compensated in order to prevent cooling of device 10 and of the satellite and to minimize occurring thermal gradients. This is realized by heating element 155B. An excessive cooling down of the focusing arrangement 170 is prevented by the heating element 155B which is arranged opposite to the focusing arrangement 170.

Both insulators 150A, 150B and heating elements 155A, 155B may be designed differently in terms of the size of the openings in the retroreflective surfaces, for example. Thereby, the amount of extra added thermal radiation may be influenced. In principle, the objects of these two units 150A, 155A and 150B, 155B are similar, namely: reflecting the thermal radiation and/or emission of additional thermal radiation by the heating elements.

The operating principle of the units and, in particular, the amount of the additional thermal radiation is controlled by shape and size of the holes in the triple reflectors.

Preferably, the openings of the surface 140B which receives the direct sunlight and also the impact of outer space on the side facing away from the sun are larger than the openings on the surface 140A. The size of the openings may directly depend on the possible change in temperature of the thermal source (the sending/receiving unit 110 or the sun or the outer space).

With reference to the arrows in FIG. 1, it may be easily understood that the signal carrier 190 coming in through the first passage 120A is reflected in a direction towards the second passage 120B, whereas the thermal radiation 180A that comes in through the first passage 120A is in turn reflected in a direction towards the first passage 120A.

Figure 2:
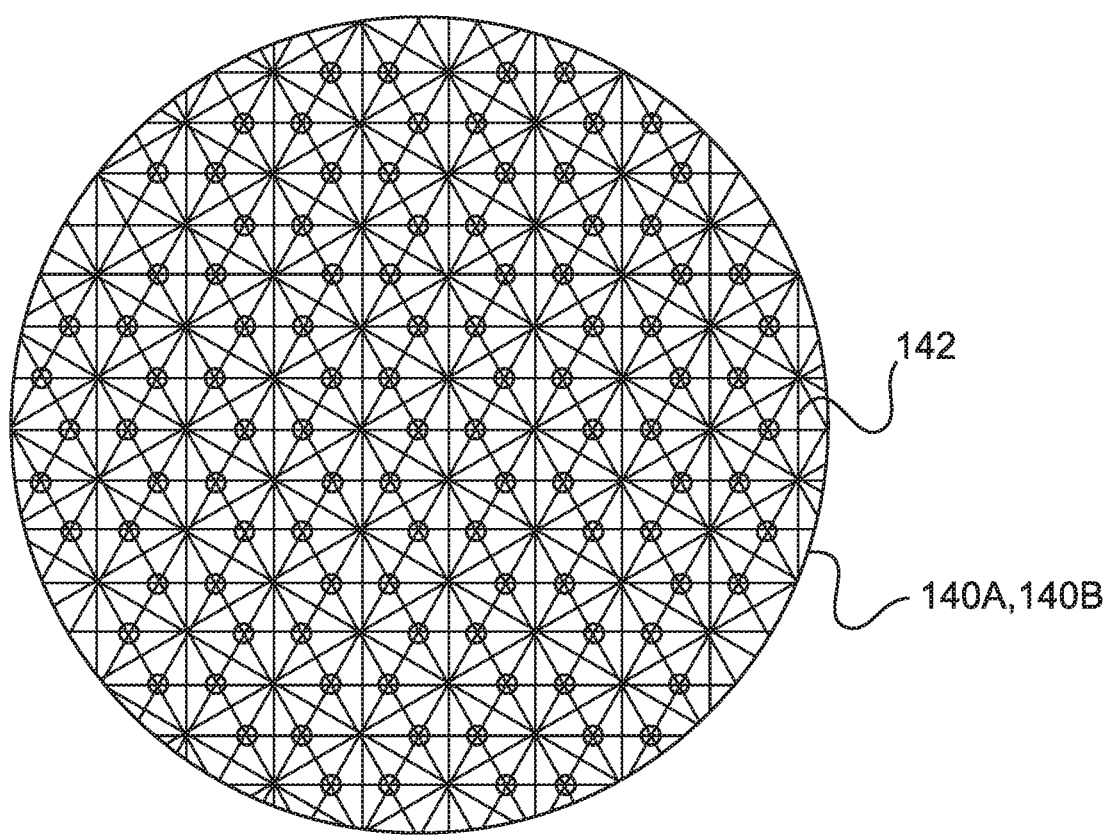
FIG. 2 a schematic representation of a retroreflective surface for a device for a sending and receiving unit of a communication arrangement.

FIG. 2 shows a retroreflective surface 140A, 140B which comprises a multitude of triple reflector elements 142. This may also be referred to as triple reflector array. For example, the surface of the triple reflector array may be gilded. A thermal and controlled black body, the thermal insulator 150A, 150B, and a heating element 155A, 155B that radiates through the openings 147 are arranged behind the triple reflector array.

The triple reflector array may be circular and may have a diameter of 80 mm. It may be a compressed plastic component which comprises a metallic coating, e.g. of gold, silver, or copper, or a combination thereof.

Figure 3:
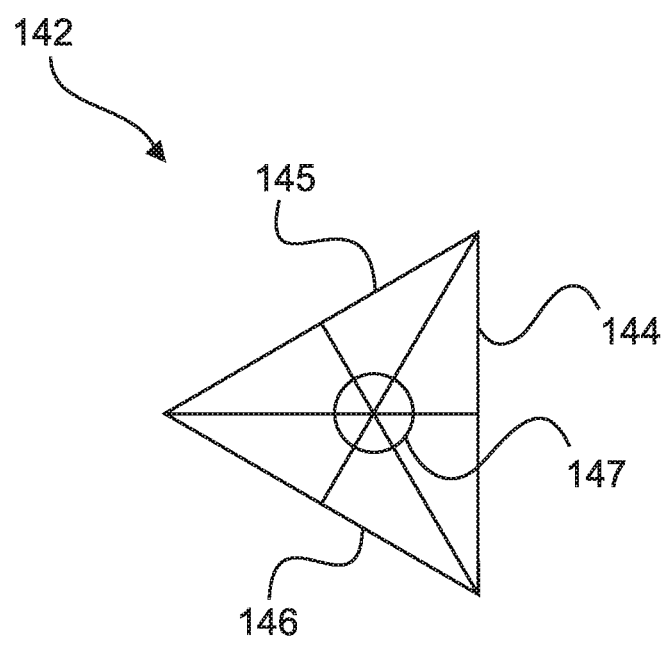
FIG. 3 a schematic representation of a retroreflector.

FIG. 3 shows a single triple reflector element 142. The triple reflector element 142 comprises three reflective lateral surfaces 144, 145, 146 which are arranged such that incoming radiation is reflected back to the source.

The triple reflector element 142 comprises an opening 147. An infrared condenser serving as a thermal radiation source may be arranged in this opening.

Additionally, it is noted that "comprising" or "including" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

LIST OF REFERENCE SIGNS 10 device
110 sending and/or receiving unit
120A first passage
120B second passage
130 partially transparent surface
140A first retroreflective surface
140B second retroreflective surface
142 retroreflector
144 first lateral surface
145 second lateral surface
146 third lateral surface
147 opening
150A first insulator
150B second insulator
155A first heating element
155B second heating element
160 sun filter
170 focusing arrangement
180A electromagnetic waves of the first wave length range
180B electromagnetic waves of the first wave length range
190 electromagnetic waves of the second wave length range While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A device for a sending and receiving unit of a communication arrangement, the device comprising:
   a first passage for electromagnetic waves and a second passage for electromagnetic waves;
   a partially transparent surface which is transparent for electromagnetic waves of a first wave length range and which is reflective for electromagnetic waves of a second wave length range, wherein the second wave length range differs from the first wave length range;
   a first retroreflective surface which is configured to reflect incident electromagnetic waves back, at a same angle at which the incident electromagnetic waves hit the first retroreflective surface, to a source of the incident electromagnetic waves without deflection or redirection for electromagnetic waves of the first wave length range;
   wherein a direction of reflection of the electromagnetic waves of the first wave length range differs from a direction of reflection of the electromagnetic waves of the second wave length range if the electromagnetic waves of the first wave length range as well as the electromagnetic waves of the second wave length range enter through the same passage.

2. The device of claim 1, wherein the partially transparent surface is a band-stop filter that reflects electromagnetic waves having a wave length between 1000 nm and 1600 nm.

3. The device of claim 1, wherein the electromagnetic waves of the second wave length range are laser radiation.

4. The device of claim 1, wherein the partially transparent surface comprises a dichroitic filter.

5. The device of claim 1, wherein the partially transparent surface comprises germanium.

6. The device of claim 1, further comprising a first thermal insulator, wherein the first thermal insulator is arranged behind the first retroreflective surface from the perspective of the first passage.

7. The device of claim 1, further comprising a first heating element configured to dispense thermal energy and to supply the thermal energy to the first retroreflective surface.

8. The device of claim 1, wherein the first retroreflective surface comprises a metallic coating.

9. The device of claim 1, wherein the first retroreflective surface comprises at least one triple reflector element configured to reflect incoming electromagnetic radiation back to its origin.

10. The device of claim 8, wherein the at least one triple reflector element comprises an opening through which an input of additional thermal radiation may take place, which thermal radiation is dispensed in the same direction as the electromagnetic waves of the first wave length range.

11. The device of claim 1, further comprising a second retroreflective surface, wherein:
    the first retroreflective surface is arranged opposite to the first passage;
    the second retroreflective surface is arranged opposite to the second passage; and
    the partially transparent surface is arranged between the first passage and the first retroreflective surface and between the second passage and the second retroreflective surface, so that the electromagnetic waves of the second wave length range that impinge onto the partially transparent surface through the first passage are reflected in a direction of the second passage.

12. The device of claim 11, wherein the first retroreflective surface and the second retroreflective surface are flat and intersect with respect to one another at an angle unequal to 0° and unequal to 180°.

13. The device of claim 11, further comprising a sending and/or receiving unit configured to emit the electromagnetic waves of the second wave length range in a direction towards the partially transparent surface and/or configured to receive electromagnetic waves of the second wave length range that are reflected by the partially transparent surface.

14. The device of claim 11, further comprising a sun filter and a focusing arrangement, wherein:
the sun filter is arranged between the focusing arrangement and the second passage;
the sun filter is configured to filter radiation intruding into the second passage and to be transparent for electromagnetic waves of the second wave length; and
the focusing arrangement is configured to focus electromagnetic waves of the second wave length and to direct the electromagnetic waves towards a remote station.

15. A spacecraft, comprising:
a device for a sending and receiving unit of a communication arrangement, the device comprising:
a first passage for electromagnetic waves and a second passage for electromagnetic waves;
a partially transparent surface which is transparent for electromagnetic waves of a first wave length range and which is reflective for electromagnetic waves of a second wave length range, wherein the second wave length range differs from the first wave length range; and
a first retroreflective surface which is configured to reflect incident electromagnetic waves back, at a same angle at which the incident electromagnetic waves hit the first retroreflective surface, to a source of the incident electromagnetic waves without deflection or redirection for electromagnetic waves of the first wave length range;
wherein a direction of reflection of the electromagnetic waves of the first wave length range differs from a direction of reflection of the electromagnetic waves of the second wave length range if the electromagnetic waves of the first wave length range and the electromagnetic waves of the second wave length range enter through the same passage; and
wherein the device is provided for establishing a communication link.

\* \* \* \* \*